United States Patent
Liu et al.

(10) Patent No.: US 10,785,838 B2
(45) Date of Patent: Sep. 22, 2020

(54) INDOOR POWER LINE TRANSMISSION CONTROL SYSTEM

(71) Applicant: LUXCOTECH LIMITED, London (GB)

(72) Inventors: Hon Sheung Liu, Hong Kong (HK); Sing Ng, Hong Kong (HK); Xiacong Liu, Hong Kong (HK); Wai Pak Choi, Hong Kong (HK)

(73) Assignee: LUXOTECH LIMITED, London (GB)

( * ) Notice: Subject to any disclaimer, the term of this patent is extended or adjusted under 35 U.S.C. 154(b) by 0 days.

(21) Appl. No.: 16/483,755

(22) PCT Filed: Nov. 10, 2017

(86) PCT No.: PCT/CN2017/110360
§ 371 (c)(1),
(2) Date: Aug. 6, 2019

(87) PCT Pub. No.: WO2018/149181
PCT Pub. Date: Aug. 23, 2018

(65) Prior Publication Data
US 2019/0394848 A1 Dec. 26, 2019

(30) Foreign Application Priority Data
Feb. 17, 2017 (CN) .................... 2017 2 0143514 U

(51) Int. Cl.
*H05B 45/10* (2020.01)
*H05B 47/185* (2020.01)
(Continued)

(52) U.S. Cl.
CPC ............ *H05B 45/10* (2020.01); *H04B 3/542* (2013.01); *H05B 47/185* (2020.01); *G08C 19/02* (2013.01); *H04B 2203/5408* (2013.01)

(58) Field of Classification Search
None
See application file for complete search history.

(56) References Cited

U.S. PATENT DOCUMENTS

| 8,994,276 B2 * | 3/2015 | Recker | H05B 37/0218 |
| | | | 315/160 |
| 2004/0227472 A1 * | 11/2004 | Gaus, Jr. | H05B 37/0263 |
| | | | 315/314 |

(Continued)

FOREIGN PATENT DOCUMENTS

CN 204948443 U 1/2016

OTHER PUBLICATIONS

International Search Report of PCT Patent Application No. PCT/CN2017/110360 dated Feb. 11, 2018.

*Primary Examiner* — Amy Cohen Johnson
*Assistant Examiner* — James H Cho

(57) ABSTRACT

An indoor power line transmission control system, includes: a transforming dimming controller (1), which is used to load, onto an electrical signal, a received dimming signal sent by a mobile terminal or input by a user in a touch-control manner, and send the electrical signal loaded with the dimming signal to a dimming driver (2); and the dimming driver, which is electrically connected with the transforming dimming controller and a dimming luminaire (3), and used to read the electrical signal loaded with the dimming signal, and adjust a gray scale of the dimming luminaire according to the read electrical signal. By replacing a normal switch with the transforming dimming controller and by using the dimming driver and transmitting the dimming signal to the dimming luminaire by means of a power line, flexibility of having no wiring, simple extension and smart dimming are realized and energy can be saved.

6 Claims, 3 Drawing Sheets

(51) Int. Cl.
*H04B 3/54* (2006.01)
*G08C 19/02* (2006.01)

(56) References Cited

U.S. PATENT DOCUMENTS

| | | | |
|---|---|---|---|
| 2012/0133298 A1* | 5/2012 | Campbell | H05B 33/0845 |
| | | | 315/250 |
| 2013/0034172 A1* | 2/2013 | Pettler | H04B 3/54 |
| | | | 375/257 |
| 2015/0132006 A1* | 5/2015 | Inoue | H05B 37/0263 |
| | | | 398/118 |
| 2015/0156829 A1* | 6/2015 | Lin | H05B 33/083 |
| | | | 315/192 |

* cited by examiner

INDOOR POWER LINE TRANSMISSION CONTROL SYSTEM

TECHNICAL FIELD

The present application relates to the field of smart home technologies, and in particular to an indoor power line transmission control system.

BACKGROUND

At present, with the development of the concept of smart home, we see more and more smart home implementation schemes, especially luminaire lighting schemes, which are divided into wireless schemes and wired schemes. The wireless schemes are based on Bluetooth, wifi, zigbee and the like. The wired schemes are based on analog electrical level, pwm, triac and the like. The existing wireless schemes allow for the flexibility of having no wiring and has the potential for continuous bursting in application forms, but DHCP is required to dynamically allocate an IP address and a software layer is required to bind a domain name each time the wireless terminal is started, making it necessary to have special associated software and technical guidance in setting up the application. In addition, due to the high complexity and the generally low reliability of the system, the user experience is poor. The existing wired schemes have better reliability and convenient configuration for use, but have a poor continuous expansion capability in application due to the fact that the control lines need to be arranged in advance during decoration with low flexibility and high cost. Further, the existing wireless/wired schemes have no dimming function to automatically adjust the power of the illumination according to ambient lighting, resulting in low energy consumption efficiency.

Therefore, the technical problem to be solved urgently is to integrate the advantages of the existing wireless and wired schemes so as to realize flexibility of having no wiring, simple extension, smart dimming, and thereby saving energy.

SUMMARY OF THE APPLICATION

The technical problem to be solved by the present application is to provide an indoor power line transmission control system, which realizes the flexibility of having no wiring, simple extension, smart dimming, and thereby saving energy.

In order to achieve the above objective, the present application adopts the following technical solutions.

An indoor power line transmission control system is provided. The control system includes: a transforming dimming controller, which is configured to load, onto an electrical signal, a received dimming signal sent by a mobile terminal or input by a user in a touch-control manner, and to send the electrical signal loaded with the dimming signal to a dimming driver; and the dimming driver, which is electrically connected with the transforming dimming controller and a dimming luminaire, and configured to read the electrical signal loaded with the dimming signal, and to adjust a gray scale of the dimming luminaire according to the read electrical signal.

The transforming dimming controller includes:

a first power supply processor, which is connected to mains, and configured to convert the mains into an alternating current adapted to the dimming luminaire, and to transmit the alternating current to a first power line transmission modem;

a first logic control digital module, which is configured to receive the dimming signal sent by the mobile terminal or input by the user in a touch-control manner, and to transmit the received dimming signal to the first power line transmission modem; and the first power line transmission modem, which is connected with the first power supply processor and the first logic control digital module, and configured to load the dimming signal onto the processed electrical signal, and to send the electrical signal loaded with the dimming signal to the dimming driver.

The dimming driver includes:

a second power supply processor, which is electrically connected with the first power line transmission modem, and configured to convert an input alternating current signal into a direct current signal output;

a second power line transmission modem, which is electrically connected with the first power line transmission modem, and configured to extract the dimming signal output by the first power line transmission modem, and to transmit the extracted dimming signal to a second logic control digital module; and the second logic control digital module, which is electrically connected with the second power line transmission modem and the dimming luminaire, and configured to output a digital driving signal to the dimming luminaire according to the extracted dimming signal to adjust the gray scale of the dimming luminaire.

The second logic control digital module is connected with an ultrahigh frequency radio frequency antenna, and electric energy and a control signal are transmitted to an illumination sensor through the ultrahigh frequency radio frequency antenna so as to obtain an ambient illumination signal sent by the illumination sensor according to the control signal; the ambient illumination signal is weighted with the dimming signal, according to a calculation result of which the gray scale of the dimming luminaire is adjusted.

The second logic control digital module is further configured to acquire, by using the ultrahigh frequency radio frequency antenna, a positioning signal sent by a portable positioning device, and to transmit the positioning signal to the second power line transmission modem. The second power line transmission modem loads the positioning signal onto the electrical signal and transmits it to the first power line transmission modem. The first power line transmission modem reads the positioning signal, and transmits the positioning signal to the first logic control digital module. The first logic control digital module sends the positioning signal to the mobile terminal, and the mobile terminal knows a position of the portable positioning device according to a position of the dimming luminaire.

The dimming luminaire is a dimming bulb or a dimming LED/OLED, the dimming LED/OLED being connected with an LED driving module before being connected with the dimming driver;

if the dimming luminaire is a dimming bulb, the dimming driver is disposed on the dimming bulb; and if the dimming luminaire is a dimming LED/OLED, the dimming driver and the LED driving module are integrated into one module.

The dimming luminaire is a plurality of dimming bulbs and/or dimming LEDs/OLEDs connected in parallel.

The first power supply processor is further configured to convert the mains into a 5V/12V direct current output for internal use of the transforming dimming controller to ensure normal operation of the transforming dimming controller.

The second power supply processor is further configured to convert the mains into a 5V/12V/18V DC output for internal use of the dimming driver to ensure normal operation of the dimming driver.

The mobile terminal is a mobile phone or a tablet computer, and is configured to communicate with the transforming dimming controller through WIFI.

Compared with the prior art, the application has the following beneficial effects. By replacing a normal switch with the transforming dimming controller, and by using the dimming driver and transmitting the dimming signal to the dimming luminaire by means of a power line, the present application realizes the flexibility of having no wiring, simple extension and smart dimming, and thus saves energy.

BRIEF DESCRIPTION OF THE DRAWINGS

In order to more clearly illustrate the technical solutions in the embodiments of the present application, the drawings used in the description of the embodiments of the present application will be briefly described below. Obviously, the drawings depicted hereinafter are only some embodiments of the present application, and a person skilled in the art would obtain other drawings from the contents of the embodiments in the present application and these drawings without involving any inventive effort.

DETAILED DESCRIPTION OF THE EMBODIMENTS

In order to make the technical problems to be solved, technical solutions to be adopted and technical effects to be achieved by the present application more apparent, the technical solutions of the embodiments of the present application will be described in further detail with reference to the drawings. Obviously, the embodiments described are only some of embodiments of the present application, and are not all of embodiments thereof. Based on the embodiments in the present application, all other embodiments obtained by those of ordinary skill in the art without involving any inventive effort are within the scope of protection of the present application.

Figure 1:
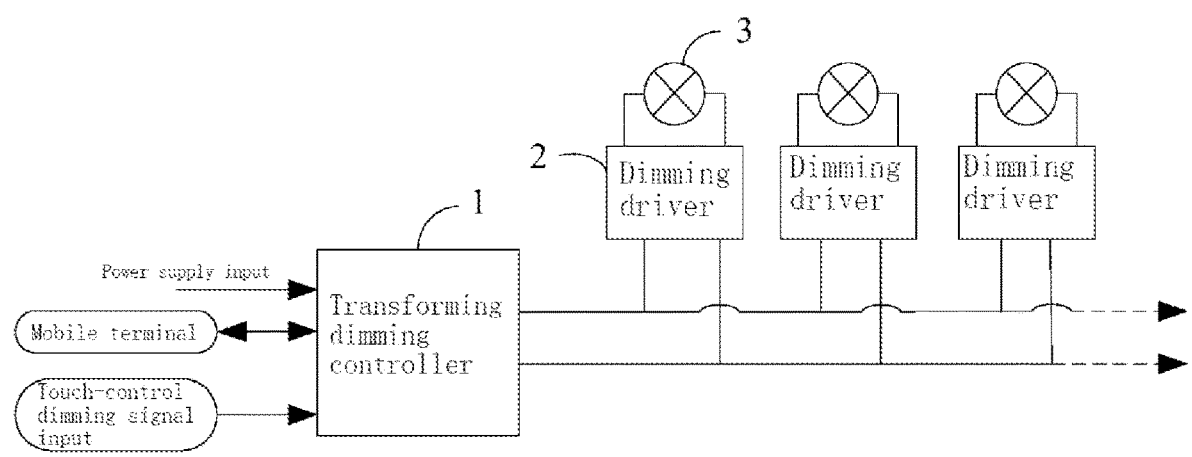
FIG. 1 is a block diagram 1 of an indoor power line transmission control system provided by the present application.
Figure 2:
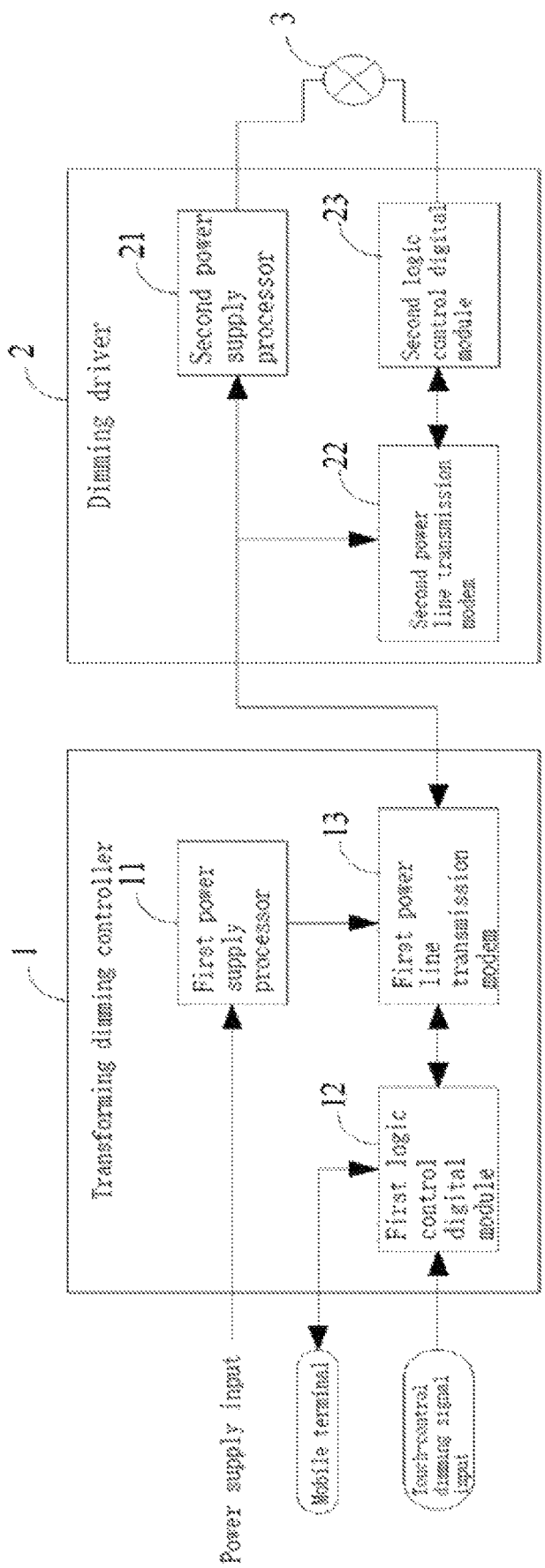
FIG. 2 is a block diagram 2 of an indoor power line transmission control system provided by the present application.
Figure 3:
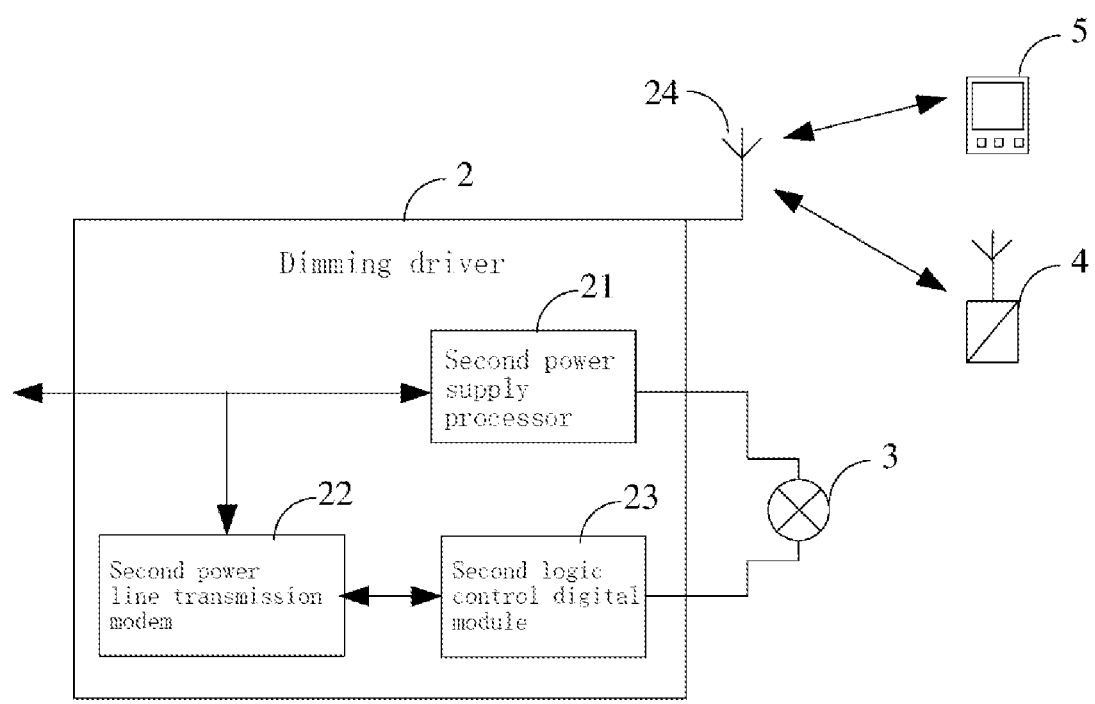
FIG. 3 is a block diagram of a dimming driver of an indoor power line transmission control system provided by the present application.

Referring to FIGS. 1-3, an indoor power line transmission control system includes: a transforming dimming controller 1, which is configured to load, onto an electrical signal, a received dimming signal sent by a mobile terminal or input by a user in a touch-control manner, and to send the electrical signal loaded with the dimming signal to a dimming driver 2; and the dimming driver 2, which is electrically connected with the transforming dimming controller 1 and a dimming luminaire 3, and configured to read the electrical signal loaded with the dimming signal, and to adjust a gray scale of the dimming luminaire 3 according to the read electrical signal.

The mobile terminal shown communicates with the transforming dimming controller through wireless technologies such as WIFI or Bluetooth. The present application can be realized on the basis of original wiring only by replacing a normal switch socket with the transforming dimming controller, and loading a dimming signal on an electric signal without another wiring required. It realizes the smart adjustment of the gray scale of the dimming luminaire. The user can control the switch and the gray scale of the dimming luminaire through the mobile terminal to realize the smart home and improve the user experience.

Further, the transforming dimming controller 1 includes:

a first power supply processor 11, which is connected with mains, and configured to convert the mains into an alternating current suitable for the dimming luminaire 3, and transmit the alternating current to a first power line transmission modem 13; the first power supply processor converts the 220V mains into a low-voltage alternating current and transmits the low-voltage alternating current to the first power line transmission modem 13, for example converting the mains into a 36V alternating current, as low voltage can be energy-saving, and if the suitable alternating current for the dimming luminaire is 220V, the 220V alternating current can be directly input to the first power line transmission modem 13 without conversion;

a first logic control digital module 12, which is configured to receive the dimming signal sent by the mobile terminal or input by the user in a touch-control manner, and to transmit the received dimming signal to the first power line transmission modem 13; and the first power line transmission modem 13, which is connected with the first power supply processor 11 and the first logic control digital module 12, and configured to load the dimming signal onto a processed electrical signal and to send the electrical signal loaded with the dimming signal to the dimming driver 2.

Further, the dimming driver 2 includes:

a second power supply processor 21, which is electrically connected with the first power line transmission modem 13, and configured to convert an input alternating current signal into a direct current signal output, an output end of the second power supply processor 21 being electrically connected with the dimming luminaire 3 to supply power for the dimming luminaire; the second power supply processor 21 outputs different direct current signals according to the requirements of the dimming luminaire 3, and the second power supply processor 21 can output a direct current signal of 8V/10V/12V/16V/18V/24V;

a second power line transmission modem 22, which is electrically connected with the first power line transmission modem 13, and configured to extract the dimming signal output by the first power line transmission modem 13, and to transmit the extracted dimming signal to a second logic control digital module 23; and the second logic control digital module 23, which is electrically connected with the second power line transmission modem 22 and the dimming luminaire 3, and configured to output a digital driving signal to the dimming luminaire 3 according to the extracted dimming signal to adjust the gray scale of the dimming luminaire 3.

Further, as shown in FIG. 3, it is a block diagram of the dimming driver of the indoor power line transmission control system provided by the present application. As shown in the figure, the second logic control digital module 2 is connected with a UHF RF (Ultra High Frequency Radio Frequency) antenna 24, through which electric energy and a control signal are transmitted to a illumination sensor 4 to obtain an ambient illumination signal sent by the illumination sensor 4 according to the control signal; the second logic control digital module 2 weights the ambient illumination signal and the dimming signal, and adjusts the gray scale of the dimming luminaire 3 according to the calculation result of the weighting.

The second logic control digital module transmits the electric energy and the control signal to the illumination sensor through the UHF RF antenna. That is, the second logic control digital module transmits the electric energy and the control signal to the illumination sensor by using UHF RFID (Ultrahigh Frequency Radio Frequency Identification) identification technology. The illumination sensor detects the ambient illumination condition according to the control signal and feeds back the ambient illumination signal to the second logic control digital module through the UHF RF antenna. The second logic control digital module carries out weighting calculation on the ambient illumination signal and the dimming signal, and adjusts the gray scale of the dimming luminaire according to a dimming signal resulted from the weighting calculation, realizing the adjustment of the gray scale of the dimming luminaire according to the ambient illumination. For example, if the room is dark at the beginning and suddenly becomes very bright when the dimming luminaire is turned on, the user, especially when getting up in the middle of the night, will not be adaptable to the brightness; however, by the feedback of the illumination sensor, the brightness of the dimming luminaire can be reduced, and user experience can thus be improved.

It should be noted that the second power supply processor provides power supply to the dimming luminaire, and the second logic control digital module controls the corresponding dimming luminaire to realize the gray scale adjustment of the dimming luminaire. The first power line transmission modem in the transforming dimming controller and the second power line transmission modem in the dimming driver can both load the control signal of the dimming signal onto the electrical signal or extract the control signal of the dimming signal from the electrical signal, and transmit the signal through alternating current with high transmission efficiency.

As a preferred embodiment, the second logic control digital module 23 is further configured to acquire, by using the UHF RF antenna 24, a positioning signal sent by a portable positioning device 5 and to transmit the positioning signal to the second power line transmission modem 22. The second power line transmission modem 22 loads the positioning signal onto the electrical signal and transmits it to the first power line transmission modem 13. The first power line transmission modem 13 reads the positioning signal, and transmits the positioning signal to the first logic control digital module 12. The first logic control digital module 12 sends the positioning signal to the mobile terminal, and the mobile terminal knows a position of the portable positioning device according to a position of the dimming luminaire. In this way, the user can obtain a position of an object carrying the portable positioning device according to the position of the dimming luminaire through WIFI. The object can be a robot, an animal or a person, etc. As the position of the dimming luminaire is set in advance, the position of the portable positioning device can be known from the position of the dimming luminaire.

Further, the dimming luminaire 3 is a dimming bulb or a dimming LED/OLED, the dimming LED/OLED being connected with an LED driving module before being connected with the dimming driver.

If the dimming luminaire is a dimming bulb, the dimming driver is disposed on the dimming bulb.

If the dimming luminaire is a dimming LED/OLED, the dimming driver and the LED driving module are integrated into one module, and the second logic control digital module controls the corresponding matched LED driving module, so as to realize the gray scale adjustment of the corresponding dimming LED/OLED.

The dimming driver is disposed on the dimming bulb. As the dimming bulb is corresponding to a bulb holder, if the dimming bulb is broken, the dimming bulb can be directly replaced without changing the original bulb holder structure. A lamp tube can also be used instead of the bulb. The dimming LED/OLED usually corresponds to an LED driving module. Since the dimming driver has a relatively small structure, it can be directly integrated with the LED driving module. If it is a normal LED/OLED, the smart dimming scheme provided by the embodiment can be replaced by simply replacing the original LED driving module with the LED driving module integrated with the dimming driver, without changing the size of the space for accommodating the LED driving module, and without replacing the original LED/OLED panel, which is simple and convenient; if the dimming LED/OLED is burnt out, it can be directly replaced with a new dimming LED/OLED, which is easy and convenient to operate.

Further, the dimming luminaire 3 is a plurality of dimming bulbs and/or dimming LEDs/OLEDs connected in parallel. If the indoor space area is large, a plurality of dimming bulbs and/or dimming LEDs/OLEDs may be connected. Users can connect as many dimming bulbs or dimming LEDs/OLEDs as needed. The number of the dimming bulbs and the dimming LEDs/OLEDs is not limited herein. The number of the dimming luminaires can be set by users according to the size of the indoor space (such as a room) and as required. In a same indoor space, the number of the dimming luminaires can be up to 256, that is, one transforming dimming controller can control up to 256 dimming luminaires, which can also be used in industrial plants to achieve smart lighting.

As a preferred embodiment, the transforming dimming controller further includes a power filter disposed between a power supply input and the first power supply processor 11 for isolating carrier signals between different indoor spaces to avoid mutual interference, for example, for isolating the carrier signals of different rooms to avoid interference of signals between rooms. If it is desirable to turned off/on the dimming luminaire only in room A, the dimming luminaire in room B will not be interfered by signals in room A due to the effect of the power filter, and the dimming luminaire in room B will not be turned off/on. Due to the existence of the power filter, each indoor space is an independent power line transmission local area network, and the control signals between the indoor spaces do not interfere with each other. This realizes independent control of dimming luminaires in each indoor space, which is convenient for users to use and improves user experience.

The isolating of carrier signals between different areas can be realized through the following two modes. In mode 1, devices in each area use a same carrier frequency, and different areas use different frequencies; thereby realizing area control by means of simulation. In mode 2, different areas use a same carrier frequency, but a digital algorithm is used to implement ordering of the devices' IDs (addresses). A device similar to "DIP Switch" can be added to the transforming dimming controller, the dimming driver, and the dimming bulb to implement the functions of setting the carrier frequency in mode 1 and setting the virtual IDs (addresses) of the devices in mode 2.

It should be noted that the first power supply processor 11 is further configured to convert the mains into a 5V/12V direct current output for internal use of the transforming dimming controller 1 to ensure the normal operation of the transforming dimming controller. The second power supply processor 21 is further configured to convert the mains into a 5V/12V/18V direct current output for internal use of the dimming driver 2 to ensure the normal operation of the dimming driver.

As a preferred embodiment, the mobile terminal is a mobile phone or a tablet computer, which communicates with the transforming dimming controller through WIFI. As the wireless control field, wireless communication can also be implemented by replacing WIFI with Bluetooth. The user can control the dimming luminaire through an APP in the mobile phone or the tablet computer to achieve smart control of the lighting.

In summary, the present application provides an indoor power line transmission control system. By replacing a normal switch with the transforming dimming controller, and by using the dimming driver and transmitting the dimming signal to the dimming luminaire by means of a power line, the method realizes the flexibility of having no wiring, simple extension and smart dimming, thereby saving energy. A transforming dimming controller can control up to 256 dimming luminaires, which saves sockets. The WIFI-based mobile terminal has smart centralized control function and software upgrade capability. On the basis of basic dimming lighting control, UHF RF antenna can be deployed through the dimming luminaires, and smart dimming can be realized by the illumination sensor. By using the portable positioning device to transmit/obtain the positioning signal of the mobile device, indoor marking and positioning function is realized.

The technical principles of the present application have been described above in combination with the specific embodiments. These descriptions are only intended to explain the principles of the present application, and are not to be construed as limiting the scope of the present application in any way. The embodiments shown in the drawings are only some of the embodiments of the present application, and the actual structure is not limited thereto. A person of skill in the art can conceive of other specific embodiments of the present application based on the explanation herein without involving any inventive effort, and all such conceived embodiments shall fall within the protection scope of the present application.

The invention claimed is:

1. An indoor power line transmission control system, comprising: a transforming dimming controller, which is configured to load, onto an electrical signal, a received dimming signal sent by a mobile terminal or input by a user in a touch-control manner, and to send the electrical signal loaded with the dimming signal to a dimming driver; and the dimming driver, which is electrically connected with the transforming dimming controller and a dimming luminaire, and configured to read the electrical signal loaded with the dimming signal, and to adjust a gray scale of the dimming luminaire according to the read electrical signal, wherein, the transforming dimming controller comprises:
   a first power supply processor, which is connected to mains, and configured to convert the mains into an alternating current adapted to the dimming luminaire, and to transmit the alternating current to a first power line transmission modem;
   a first logic control digital module, which is configured to receive the dimming signal sent by the mobile terminal or input by the user in a touch-control manner, and to transmit the received dimming signal to the first power line transmission modem; and
   the first power line transmission modem, which is connected with the first power supply processor and the first logic control digital module, and configured to load the dimming signal onto a processed electrical signal, and to send the electrical signal loaded with the dimming signal to the dimming driver.

2. The indoor power line transmission control system according to claim 1, wherein, the dimming driver comprises:
   a second power supply processor, which is electrically connected with the first power line transmission modem, and configured to convert an input alternating current signal into a direct current signal output;
   a second power line transmission modem, which is electrically connected with the first power line transmission modem, and configured to extract the dimming signal output by the first power line transmission modem, and to transmit the extracted dimming signal to a second logic control digital module; and
   the second logic control digital module, which is electrically connected with the second power line transmission modem and the dimming luminaire, and configured to output a digital driving signal to the dimming luminaire according to the extracted dimming signal so as to adjust the gray scale of the dimming luminaire.

3. The indoor power line transmission control system according to claim 2, wherein, the second logic control digital module is connected with an ultrahigh frequency radio frequency antenna, through which electric energy and a control signal are transmitted to an illumination sensor, so as to acquire an ambient illumination signal sent by the illumination sensor according to the control signal, weight the ambient illumination signal with the dimming signal, and adjust the gray scale of the dimming luminaire according to a calculation result of the weighting.

4. The indoor power line transmission control system according to claim 3, wherein, the second logic control digital module is further configured to acquire, by using the ultrahigh frequency radio frequency antenna, a positioning signal sent by a portable positioning device, and to transmit the positioning signal to the second power line transmission modem; the second power line transmission modem loads the positioning signal onto the electrical signal and transmits the electrical signal to the first power line transmission modem; the first power line transmission modem reads the positioning signal, and transmits the positioning signal to the first logic control digital module; the first logic control digital module sends the positioning signal to the mobile terminal, and the mobile terminal knows a position of the portable positioning device according to a position of the dimming luminaire.

5. The indoor power line transmission control system according to claim 2, wherein, the second power supply processor is further configured to convert the mains into a 5V/12V/18V direct current output for internal use of the dimming driver to ensure normal operation of the dimming driver.

6. The indoor power line transmission control system according to claim 1, wherein, the first power supply processor is further configured to convert the mains into a 5V/12V direct current output for internal use of the transforming dimming controller to ensure normal operation of the transforming dimming controller.

* * * * *